H. P. CIESIELSKA.
CAN COVER.
APPLICATION FILED NOV. 1, 1921.
1,410,375.
Patented Mar. 21, 1922.
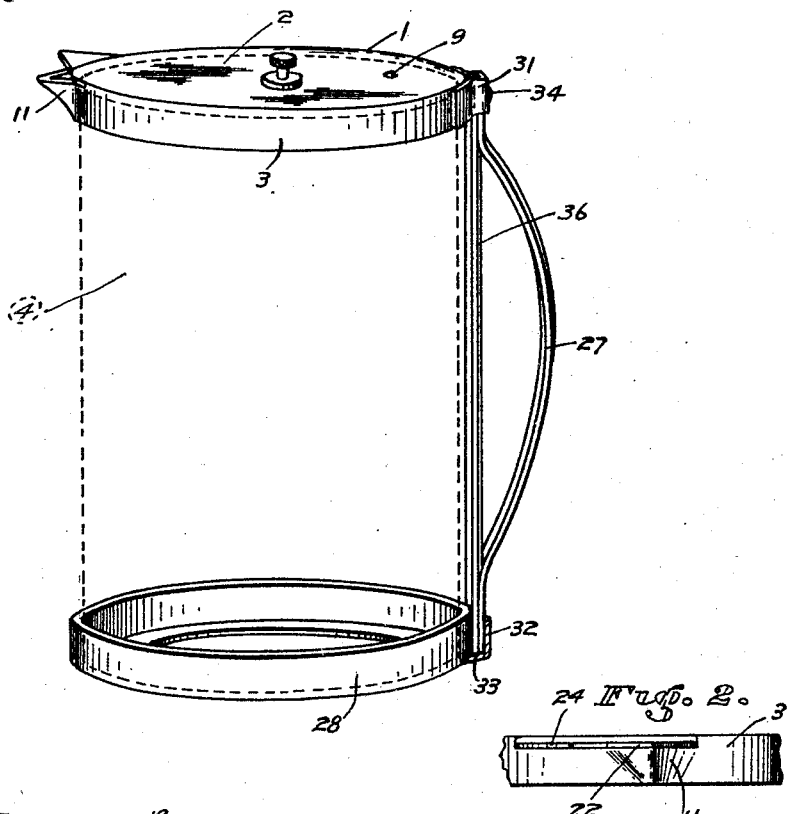
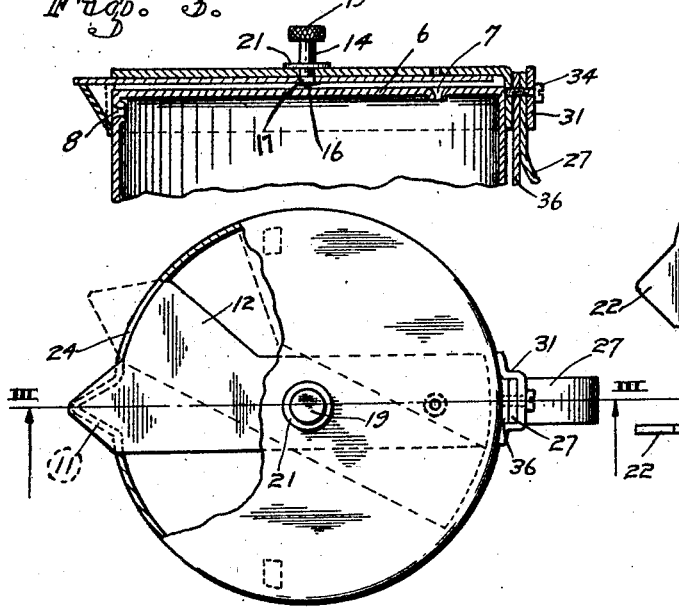
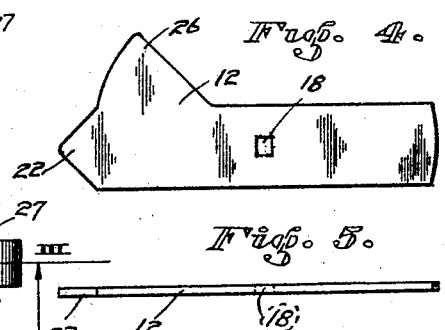
Inventor.
HELENA P. CIESIELSKA
Attorneys.

UNITED STATES PATENT OFFICE.

HELENA PAULINA CIESIELSKA, OF SAN MIGUEL, CALIFORNIA.

CAN COVER.

1,410,375.  Specification of Letters Patent.  Patented Mar. 21, 1922.

Application filed November 1, 1921. Serial No. 512,049.

*To all whom it may concern:*

Be it known that I, HELENA PAULINA CIESIELSKA, a citizen of the United States, and a resident of San Miguel, county of San Luis Obispo and State of California, have invented a new and useful Can Cover, of which the following is a specification.

The present invention relates to covers for cans generally and has reference more particularly to milk cans such as are commonly sold in the grocery stores containing condensed milk. The object of my invention is to provide a convenient cover for those milk cans which can be used after the can has been opened and which is adapted to air tightly close the can. It is well known that the cans containing condensed milk or the like are sold in a sealed state and ordinarily two holes have to be punched into the can to allow the withdrawal of any milk from the same. It is also well known that after the can has been opened in this manner air can freely enter into the same and that the milk has a tendency to spoil quickly being thus exposed. My cover produces means whereby the can can be closed immediately after use and thus the milk preserved for a longer period.

While my cover was designed with particular reference to the milk can now being sold and commonly used, it will be readily understood that the same cover can be used for other cans wherever it seems desirable to close the cans immediately after its use so as to preserve the contents of the can. The preferred form of my invention is illustrated in the accompanying drawing, it being understood that slight deviations or modifications might be made without departing from the spirit of the invention. In the drawing, Figure 1 represents a perspective view of my can cover, the location of the can itself being indicated in dotted lines; Figure 2 a side view of the cover, parts being broken away; Figure 3 a vertical cross section through the can cover along line 3—3 of Figure 6; Figure 4 a detail plan view of a slide used in combination with my cover; Figure 5 a side elevation of the same, and Figure 6 a top plan view of the can cover.

Referring to the drawings in detail it will be seen that my can cover (1) comprises the lid (2) which is provided with a marginal downwardly extending flange (3) adapted to fit on the milk can (4) to be covered. It is understood that before securing my cover on the can the latter is to be opened in suitable places, which may be done by removing the top (6) of the can altogether or by providing two small holes (7) and (8) in the can, the former penetrating the top of the can and the latter being punched preferably through the cylindrical portion of the can near the top. Referring to the location of the two holes, I prefer to arrange them in such a manner that they are disposed on the same diameter but on opposite sides of the central axis of the can. The cover (1) is provided with a hole (9) registering preferably with the hole (7) in the top of the can and with a spout (11) in the flange (3) registering with the hole (8) in the can. It will thus be seen that milk can freely be discharged from the can through the opening (8) and the spout, the holes (7) and (9) permitting of the entrance of air into the can simultaneously.

To close the can after my cover has been secured on the same I use a slide (12) shown in detail in Figure 4 and secured to the lid by means of the stud (14) provided with a head (16), a square portion (17) penetrating the hole (18) in the slide (12) so as to hold the same against rotation, a circular portion passing through the lid and a milled head (19) by means of which the stud may be conveniently rotated. A collar (21) is secured on the stud on top of the lid whereby a close contact between the lid and the slide is maintained. The slide extends both ways from the stud (14) having a rear portion adapted to normally cover the hole (9) and a front portion (22) extending outside the lid so as to normally cover the spout (11). Adjacent the latter spout is provided a slot (24) which is normally covered by a sector-shaped projection (26) extending sideways from the slide (12). The projection (26) does not extend through the slot but within close proximity to the same so as to air-tightly cover it. If it is desired to withdraw the contents of the can the slide (12) is given a slight turn to the right by means of the milled head (19) of the stud (14) whereby the front portion (22) of the slide is forced into the slot (24), the projection (26) disappearing inside the can so that the spout is opened and the hole (9) cleared simultaneously.

To provide a more convenient way for handling the can I secure to the same the handle (27) which is secured between the cover (1) and the corresponding bottom (28) fastened to the can in a similar manner as the cover. It will be noticed that the top and bottom covers are provided with sideways extending sleeves (31) and (32), the latter being closed at the bottom as shown at (33), and the former being provided with a screw (34) adapted to firmly engage the top of the handle (27), the bottom of which is slipped into the sleeve (32) as well as a straight vertical member (36) extending between and secured within the said two sleeves.

My device may be used with the handle or without the same, the principal invention lying in the particular construction of the top cover. To use my device it is only necessary to open the milk can in the customary manner by punching two holes (7) and (8) into the same and to slip on the cover so that the spout (11) registers with the hole (8) and to turn the slide (12) in such a manner that its front portion clears the spout. After the desired quantity of milk has been withdrawn the can can immediately be closed by giving a slight turn in the opposite direction to the slide (12) which turn will cover up the hole (9) and the spout (11) and will simultaneously cause the projection (26) to close the slot (24) so that an airtight cover is secured for the can. If it is desired to use the handle in conjunction with the cover it is only necessary to secure the bottom cover (28) on the can and to slip the handle (27) into the two sleeves (31) and (32) in the manner previously described.

I claim:

1. A can cover of the character described, comprising a lid having a downwardly extending flange fitting on the can, a spout in said flange, a slot in the flange adjacent the spout, a hole in the lid for admission of air into the can and a slide pivotally secured to the lid in parallel relation to the same adapted to cover the spout and the hole and to be turned into the slot so as to free both spout and hole.

2. A can cover of the character described, comprising a lid having a downwardly extending flange fitting on the can, a spout in said flange, a slot in the flange adjacent the spout, a hole in the lid for admission of air into the can and a slide pivotally secured to the lid in parallel relation to the same adapted to cover the spout, the slot and the hole and to be turned into the slot so as to free the spout and the hole.

3. In combination a can cover of the character described, comprising a lid adapted to be secured on the can, a spout and an air admitting hole in the lid and a slide associated with the lid adapted to cover or uncover the spout and the hole simultaneously so as to seal the can, a bottom secured to the can, a handle for manipulating the can, and means for securing the handle comprising an upper and a lower sleeve associated with the lid and the bottom for receiving the handle.

HELENA PAULINA CIESIELSKA.